United States Patent
Longobardi et al.

(10) Patent No.: US 6,545,822 B2
(45) Date of Patent: Apr. 8, 2003

(54) PROTECTIVE HELMET WITH AN IMPROVED REAR-VIEW OPTICAL SYSTEM

(75) Inventors: Giuseppe Longobardi, Florence (IT); Franco Francini, Florence (IT); Renzo Regini, Florence (IT); Claudio Ciamberlini, Florence (IT)

(73) Assignee: Ceo Centro di Eccellenza Optronica (IT)

( * ) Notice: Subject to any disclaimer, the term of this patent is extended or adjusted under 35 U.S.C. 154(b) by 61 days.

(21) Appl. No.: 09/921,341

(22) Filed: Aug. 2, 2001

(65) Prior Publication Data

US 2002/0018304 A1 Feb. 14, 2002

(30) Foreign Application Priority Data

Aug. 3, 2000 (EP) .............................. 00830555
Apr. 6, 2001 (EP) .............................. 01830241

(51) Int. Cl.[7] ........................ G02B 17/00; G02B 7/182; A42B 1/24
(52) U.S. Cl. ........................ 359/726; 359/879; 359/880; 2/422
(58) Field of Search ........................ 2/410, 422, 425; 359/726, 879, 880

(56) References Cited

U.S. PATENT DOCUMENTS

| | | | |
|---|---|---|---|
| 3,872,299 A | 3/1975 | Nicolas | 250/201.1 |
| 5,486,948 A | 1/1996 | Imai et al. | 359/462 |
| 5,771,497 A * | 6/1998 | Steele | 2/422 |

FOREIGN PATENT DOCUMENTS

| | | |
|---|---|---|
| DE | 27 30 635 | 1/1979 |
| EP | 0 007 432 | 2/1980 |
| EP | 0 213 890 | 3/1987 |
| JP | 2000-80511 | 3/2000 |

* cited by examiner

Primary Examiner—Georgia Epps
Assistant Examiner—David Spector
(74) Attorney, Agent, or Firm—McGlew and Tuttle, P.C.

(57) ABSTRACT

The protective helmet comprises within its thickness at least one optical path, having a dorsal entry and a frontal exit, for conveying to the eye (O) of the user an image of the scene behind said user's back. An objective lens (11) is disposed at the point of said dorsal entry aperture. An eyepiece and a reflecting optical member are disposed at the point of said frontal exit, said reflecting optical member being positioned so as to reflect the image coming from said eyepiece toward the eye of the wearer of the helmet; and at least one refractive member is disposed along said optical path, between said lens and said eyepiece (23).

19 Claims, 5 Drawing Sheets

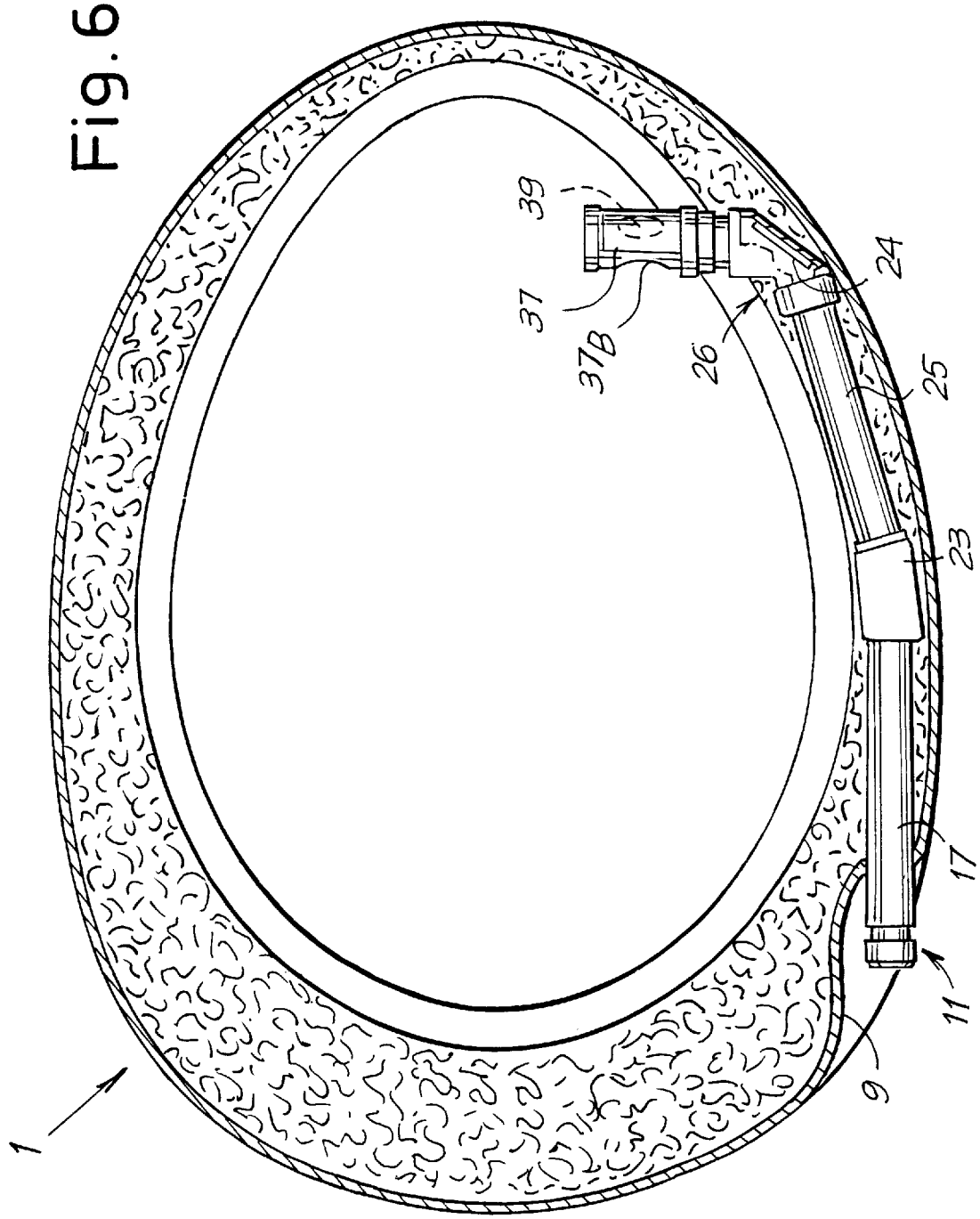

PROTECTIVE HELMET WITH AN IMPROVED REAR-VIEW OPTICAL SYSTEM

FIELD OF THE INVENTION

The present invention relates to a rear-view optical system for protective helmets, in particular for helmets for use by cyclists, motorcyclists, car drivers and the like, both for pleasure and in sport and competition, and more particularly for helmets equipped with a visor.

PRIOR ART

No reliable and practical rear-view systems currently exist for helmets for use by motorcyclists or the like. U.S. Pat. No. 3,804,495 describes a rear-view system based on a set of reflecting mirrors. This system is cumbersome, in that it is fitted externally on the helmet and, more particularly, above a fixed visor projecting from the helmet. A rear-view system of this type, apart from being impractical, is not even compatible with today's regulations on safety which prohibit the presence of projecting articles on a protective helmet.

IT-B-1 155 186 discloses a rear-view system incorporated in the thickness of the helmet. This dorsal viewing system entirely comprises reflective members such as prisms and mirrors. The system is cumbersome and incapable of providing a sufficiently broad view. Furthermore, the type of optics used are such as to require extensive space and therefore unacceptably weaken the structure of the helmet.

WO-A-97/10731 discloses a further rear-view system which envisages a channel cut out within the helmet. A series of mirrors disposed along the channel serves to guide the beam from the dorsal entry to the frontal exit. This system possesses, in addition to the disadvantages already mentioned with reference to the device described in IT-B-1 155 186, the disadvantage that the reflective surfaces are subject to soiling and cannot be accessed for effective cleaning, for which reason the system rapidly loses the ability to ensure an acceptable view.

Therefore, because of the inadequacy of the available solutions, use is currently made of rear-view mirrors fitted to the handlebars of vehicles (specifically bicycles and motorcycles). These mirrors are expensive, liable to break in the event of an accident, hazardous in that they project from the handlebar, and absolutely non-functional in that rearward vision is in any case difficult, especially for persons wearing a full helmet.

OBJECTS AND SUMMARY OF THE INVENTION

The subject of the present invention is a new rear-view system for protective helmets for use by motorcyclists, car drivers or the like, which does not exhibit the disadvantages of the traditional systems.

More specifically, an object of the present invention is to provide an optical system and a protective helmet which are compatible with the safety standards relating to protective helmets.

A further object of the present invention is to provide a helmet having a rear-view optical system which allows an easy and safe view of the scene behind and which at the same time does not interfere with the view of the scene in front and does not reduce the safety features of the helmet.

Yet another object of the present invention is to provide a helmet which makes it possible to avoid the need for using rear-view mirrors on vehicles, which are frequently costly, non-functional and inconvenient if not dangerous in that they are fitted on the handlebars of vehicles.

These and further objects and advantages, which will be clear to those skilled in the art from reading the text that follows, are achieved with a protective helmet comprising within its thickness at least one optical path, having a dorsal entry and a frontal exit, for conveying to the eye of the user an image of the scene behind said user's back, characterized in that:

an objective lens is disposed at the point of said dorsal entry aperture;

an eyepiece is disposed at the point of said frontal exit;

a reflecting optical member is provided in front of said eyepiece and is positioned so as to reflect the image coming from said eyepiece toward the eye of the wearer of the helmet;

and at least one refractive member, and preferably two refractive members, are disposed along said optical path, between said objective and said eyepiece.

The use of the entry and exit optics makes it possible to produce a particularly narrow path which can therefore be disposed within the thickness of the helmet without affecting its features of shape and safety. Furthermore, the use of at least two refractive members make it possible to cause the beam to follow a curved optical path, which can thus follow the curvature of the helmet, remaining within the traditional outline of the latter. In particular, the use of the two refractive members makes it possible to produce an optical path which can extend at the height of the portion of the helmet which is located in the zone of the user's ear. By this arrangement, it is possible to obtain deflections of the incoming beam through an angle equal to or greater than 25° and preferably greater than 30° before it reaches the reflective member. Depending on the angle of reflection achieved with the reflecting member located in front of the eyepiece, similar advantages can be obtained also with only one refractive member.

Either a portion or the whole of the optical path may be provided within a member applied to the main shell of the helmet. The path remains in any case internal to the whole thickness of the same helmet.

According to a possible embodiment of the invention, the two refractive members are symmetrical. They may take the form of two simple optical prisms. However, in order to obtain a high deflection of the optical beam, it is advantageous to arrange for each refractive member to comprise a pair of optical wedges having different refractive indexes. The two refractive members may be mutually different but are preferably symmetrical, that is to say each comprise a pair of optical wedges that are identical but mounted symmetrically.

The refractive members may possess an entry surface and an exit surface for the beam conveyed along said path which form an angle of between 25° and 30°, and preferably approximately equal to 27°.

The two optical wedges may have refractive indexes of, for example, in excess of 1.65. Preferably, the first wedge possesses a refractive index in excess of 1.65 and the second of said optical wedges possesses a refractive index in excess of 1.75.

The eyepiece may advantageously comprise a lens which is adjustable for focusing, so as to permit simple adaptation to the visual capability of the person wearing the helmet. Furthermore, provision may advantageously be made for the reflective optical member to be mounted in a sleeve substantially coaxial with the eyepiece and capable of adjustment about the axis of the eyepiece to direct the beam correctly toward the eye of the user. In this manner, the helmet is made adaptable to the anatomical configuration of the person wearing it.

Preferably, there are two optical paths, normally but not necessarily symmetrical, in order to permit binocular rearward vision.

Further advantageous features and embodiments of the helmet according to the invention are indicated in the attached dependent claims.

BRIEF DESCRIPTION OF THE DRAWINGS

The invention will be better understood by reference to the description and the attached drawing, which shows a practical, non-limiting embodiment of the invention. More particularly, in the drawing:

FIGS. 5 and 6 show, respectively, a side view and a section taken on line VI—VI of FIG. 5, of a helmet in a modified embodiment.

DETAILED DESCRIPTION OF THE PREFERRED EMBODIMENTS OF THE INVENTION

Figure 1:
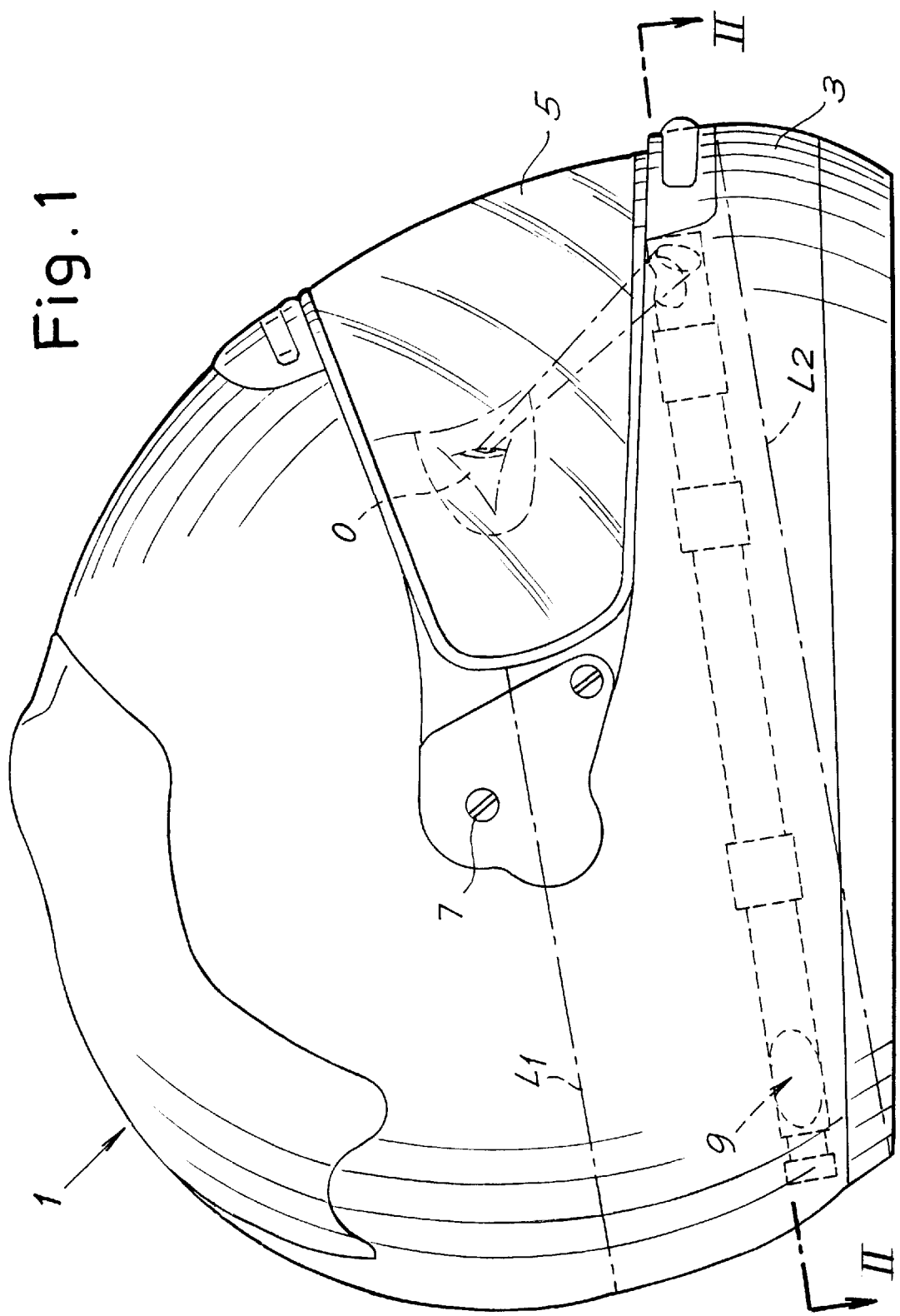
FIG. 1 shows a lateral view of a helmet.

FIG. 1 shows a lateral view of a complete helmet, generically designated 1 and equipped with a chinpiece 3 and a visor 5 hinged on the body of the helmet 1 at 7. Within the thickness of the helmet 1, in a zone comprised between the two lines designated L1 and L2, is provided an optical path which permits the wearer of the helmet to have a clear view of the rearward or dorsal scene. A description will now be given of the configuration of a single optical path, it being understood however that two symmetrical paths may be provided within the helmet, one for each eye of the user.

In FIG. 1, the reference numeral 9 designates the dorsal portion of the optical path which will be described in more detail with reference to FIG. 2. The latter shows the diagrammatic configuration of the optical path in the plane marked II—II in FIG. 1.

Figure 2:
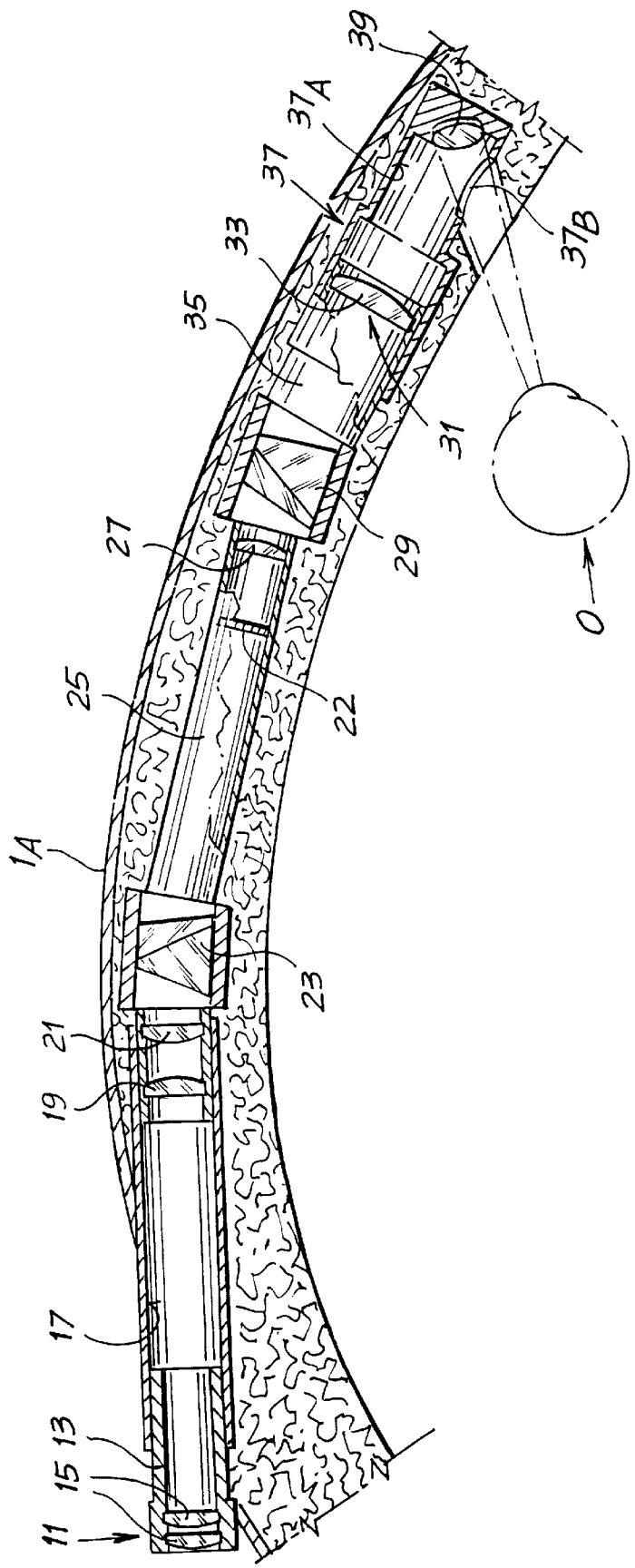
FIG. 2 shows a partial section along the plane indicated by II—II in FIG. 1.

With reference to FIG. 2, the optical path comprises a dorsal objective lens 11 accommodated in a first sleeve 13 and comprising a set of lenses 15. The sleeve 11 projects dorsally from the helmet and constitutes the outer portion 9 of the optical path visible in FIG. 1. The sleeve 13 within which the objective lens 11 is accommodated is inserted in a tube 17 which extends within the thickness of the helmet shown in FIG. 2; the outer shell is designated 1A. The optical path continues with two convergent lenses 19 and 21 disposed in the vicinity of the end of the tube 17 opposite that in which the sleeve 13 is inserted.

Continuing along the optical path, a first refractive member 23 is encountered whose structure will be described in more detail with reference to FIG. 4. The refractive member 23 deflects the optical path through an angle in excess of 16° and causes it to continue within a second tube 25, at whose end opposite to the first refractive member 23 a further convergent lens 27 is disposed. Downstream of the latter is disposed a second refractive member 29 which further diverts the path of the optical beam toward an eyepiece, generically designated 31 and comprising at least one lens 33. This is accommodated in a sleeve 35 telescopically inserted in a pipe 37 so as to be able to slide axially relative to the latter.

The sleeve 37 continues with a portion 37A of reduced diameter, at the end of which is disposed a reflective optical member 39, for example simply a mirror. The latter is inclined in a manner such as to divert the beam arriving from the eyepiece 31 toward the eye of the observer, in other words the wearer of the helmet 1. In FIG. 2, O approximately indicates the position of the eye. To allow the beam arriving from the eyepiece 31 to reach the eye O, the portion 37A of the sleeve 37 possesses an opening 37B. The orientation of the mirror 39 may be adjusted by rotating the sleeve 37 about its own axis until the mirror 39 is brought into the correct position relative to the eye O of the observer.

Figures 3, 4:
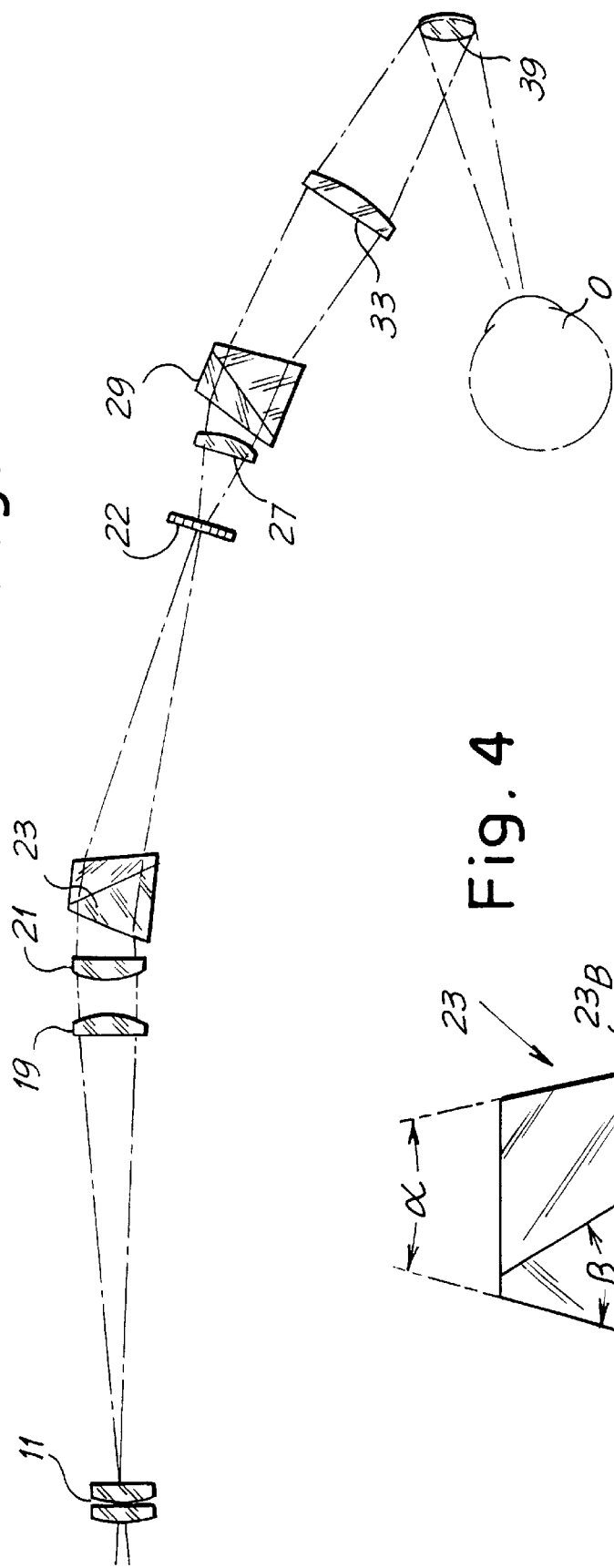
FIG. 3 shows in isolation the optical components along the optical path of the rear-view system.
FIG. 4 shows one of the two refractive members.

FIG. 3 shows the optical members constituting the path without the mechanical part, in order to show more clearly the features of the dioptric members, in particular their focal lengths. The objective lens 11 possesses a focal length of 6.5 mm, while the unit comprising the lenses 19 and 21 possesses a focal length of 70 mm. At the focus of the set of lenses 19 and 21 is a diaphragm 22 mounted within the tube 25.

The lens 27 has a focal length of 70 mm, equal to the focal length of the lens 33 constituting the eyepiece of the optical system. The two refractive elements 23 and 29 are identical and mounted in symmetrical positions. FIG. 4 shows an enlargement of the refractive member 23. This comprises a pair of optical wedges 23A and 23B, joined with the use of an appropriate optical adhesive along an interface surface 23C. Overall, the refractive member is in the form of a prism having an isosceles trapezoidal section with an entry surface 41 formed by one of the faces of the wedge 23A and an exit surface 43 formed by one face of the optical wedge 23B. The two faces 41 and 43 form between them an angle $\alpha$ of approximately 27°.

The wedge 23A possesses an angle $\beta$ formed by the face 41 at the interface 23C equal to approximately 45°. The angle formed by the exit surface 43 from the wedge 23B and the interface 23C, designated by $\gamma$ is approximately equal to 18° and 28'.

The wedge 23A possesses a refractive index equal to 1.691 and is produced, for example, from LHK9 glass, while the wedge 23B possesses a refractive index equal to 1.784 and is produced, for example, from SF11 glass.

FIG. 4 shows by way of example the median ray R striking the face 41 of the wedge 23 at an angle of 8°18' relative to the base 23D of the refractive member 23. At the angles described above and with the refractive indexes indicated above, the ray R undergoes a series of refractions within the wedge 23 and then emerges having undergone a deviation $\delta$ equal to 16°36', as shown in FIG. 4. Since the two refractive members 23 and 29 possess the same optical characteristics, the beam R passing through both the refractive members 23 and 29 undergoes an overall deviation of slightly less than 33°.

The high angle of deviation which is achieved with the use of the two refractive members 23 and 29, produced with the two wedges of different refractive indexes, makes it possible to obtain an optical path which can extend in the zone defined by the two lines L1 and L2 in FIG. 1, in other words in the zone which surrounds the portion of the helmet which encloses the ear of the user. In this zone, the presence of the optical path does not adversely affect the mechanical characteristics of the helmet, partly because of the very restricted dimensions of the optical components. In particular, the lenses of the objective lens 11 may have a diameter of 8 mm, while the remaining lenses 19, 21 and 27 possess a diameter of 12 mm. The eyepiece 33 possesses a diameter slightly greater than 17 mm. The refractive members 23 and 29 have heights of, for example, approximately 15 mm and a base of the same size, together with an orthogonal extent shown in FIG. 3 which is again of the same order of magnitude as their respective heights.

Figure 5:
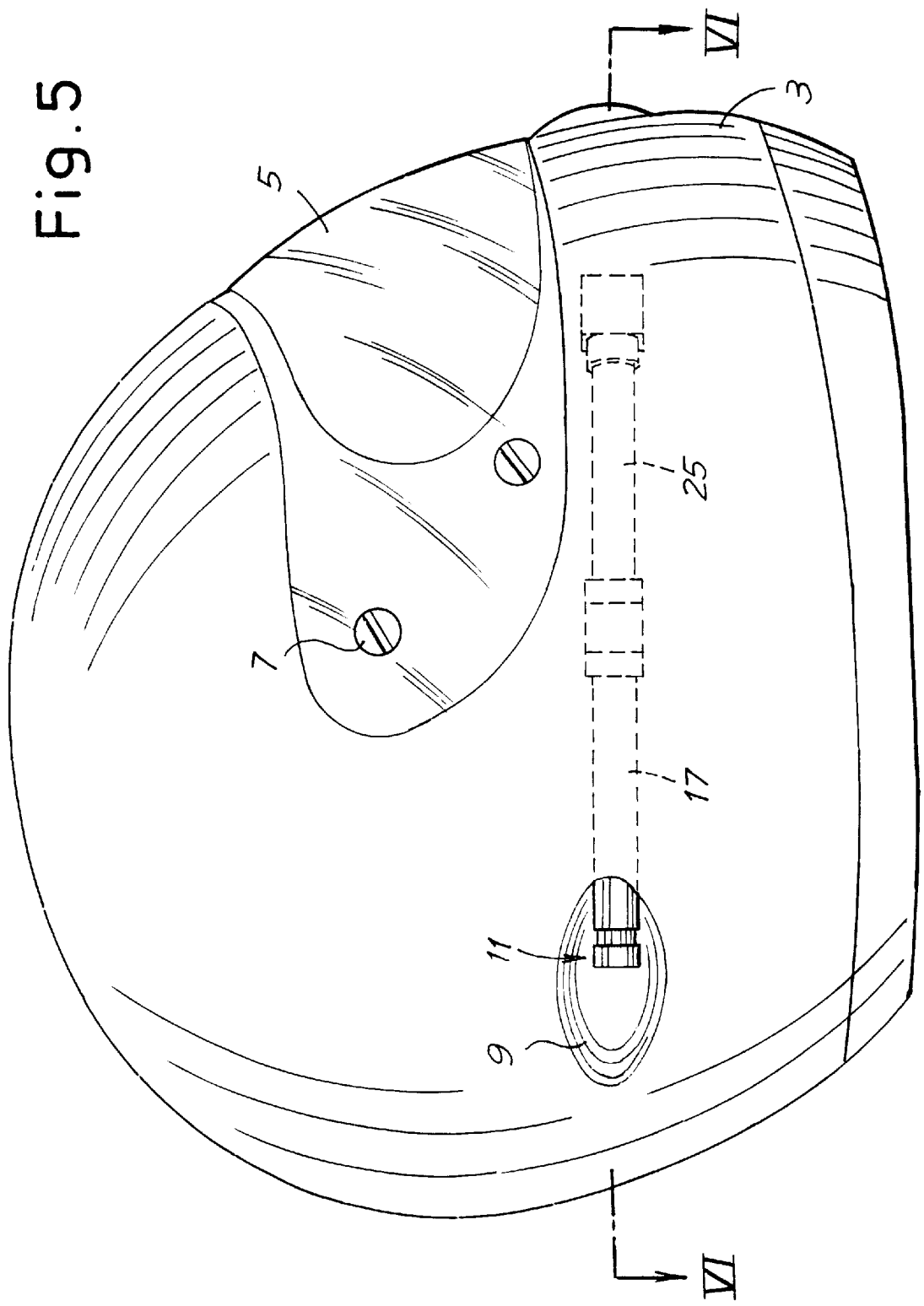

FIGS. 5 and 6 show a modified embodiment of the invention. Like numbers indicate parts identical or corresponding to those of the preceding example.

Substantially, the difference lies in the fact that along the optical path only one refractive member 23 is disposed, while the second refractive member is replaced with a reflecting member (such as a mirror or the reflecting inner surface of a prism). The reflecting member 24 is housed within an angular fitting 26 interposed between the tube 25 and the sleeve 35 with respect to the helmet.

As can be understood from a comparison between FIGS. 2 and 6, the replacement of the second refractive member with the reflecting member 24 stems from the different orientation of the sleeve with respect to the helmet. In the second example, such sleeve is disposed almost orthogonally to the vertical median plane of the helmet (plane P in FIG. 6) and this calls for a greater deviation of the optical beam.

It is understood that the drawing shows only a practical embodiment of the invention, which may vary in forms an arrangements without thereby departing from the scope of the underlying idea of the invention. Any reference numbers in the appended claims are intended to facilitate reading thereof in the light of the above description and of the attached drawings, but do not limit the scope of protection thereof.

What is claimed is:

1. A protective helmet comprising within its thickness at least one optical path, having a dorsal entry and a frontal exit, for conveying to the eye of the user an image of the scene behind said user's back, characterized in that:

an objective lens is disposed at the point of said dorsal entry aperture;

an eyepiece is disposed at the point of said frontal exit;

a reflecting optical member is provided in front of said eyepiece and is positioned so as to reflect the image coming from said eyepiece toward the eye of the wearer of the helmet;

and at least a first refractive member is disposed along said optical path, between said objective and said eyepiece.

2. The helmet as claimed in claim 1, characterized in that it comprises, along said optical path, a second refractive member.

3. The helmet as claimed in claim 2, characterized in that said two refractive members are symmetrical.

4. The helmet as claimed in claim 1, characterized in that said refractive members each comprise a pair of optical wedges of different refractive indexes.

5. The helmet as claimed in claim 1, characterized in that said refractive members possess an entry surface and an exit surface for the beam conveyed along said path which form an angle of between 25° and 30°, and preferably approximately equal to 27°.

6. The helmet as claimed in claim 4, characterized in that said two optical wedges possess a refractive index in excess of 1.65.

7. The helmet as claimed in claim 6, characterized in that the first of said optical wedges possesses a refractive index in excess of 1.65 and the second of said optical wedges possesses a refractive index in excess of 1.75.

8. The helmet as claimed in claim 6, characterized in that said first optical wedge is produced from LAK9 glass and the second optical wedge is produced from SF11 glass.

9. The helmet as claimed in claim 4, characterized in that the first optical wedge comprises an external surface through which the optical beam passes and an internal surface linked to the second optical wedge which form between them an angle of between 40° and 50°, and preferably of approximately 45°.

10. The helmet as claimed in claim 4, characterized in that the second optical wedge comprises an external surface through which the optical beam passes and an internal surface linked to the first optical wedge which form between them an angle of between 15° and 20°, and preferably of approximately 18° 28'.

11. The helmet as claimed in claim 1, characterized in that said eyepiece comprises a lens which is adjustable for focusing.

12. The helmet as claimed in claim 1, characterized in that said reflective optical member is mounted in a sleeve substantially coaxial with the eyepiece and adjustable about the axis of the eyepiece to direct the beam correctly toward the eye of the user.

13. The helmet as claimed in claim 1, characterized in that, along said optical path, the incoming beam is deflected through an angle equal to or in excess of 25° and preferably in excess of 30° before reaching said reflective member.

14. The helmet as claimed in claim 1, characterized in that a first convergent dioptric system is disposed between the entry objective lens and the first refractive member.

15. The helmet as claimed in claim 2, characterized in that a second convergent dioptric system is disposed between said two refractive members.

16. The helmet as claimed in claim 14, characterized in that:

said objective lens has a focal length of between 6 and 7 mm and preferably of approximately 6.5 mm;

said first convergent optical system has a focal length of between 60 and 80 mm and preferably of approximately 70 mm;

said second convergent optical system has a focal length of between 60 and 80 mm and preferably of approximately 70 mm;

said eyepiece has a focal length of between 50 and 80 mm and preferably of approximately 70 mm.

17. The helmet as claimed in claim 1, characterized in that said reflective member is disposed in the chinpiece of the helmet.

18. The helmet as claimed in claim 1, characterized in that said optical path extends at the height of the zone of the helmet corresponding to the ear of the user.

19. The helmet as claimed in claim 1, characterized in that it comprises two substantially symmetrical optical paths for the two eyes of the user.

* * * * *